June 28, 1960  C. H. GLASER  2,942,714
BULK MATERIAL UNLOADER
Filed April 25, 1958  3 Sheets-Sheet 1

Inventor.
Cleland H. Glaser.
By Merriam, Lorch & Smith.
Attys.

June 28, 1960　　　C. H. GLASER　　　2,942,714
BULK MATERIAL UNLOADER
Filed April 25, 1958　　　3 Sheets-Sheet 2
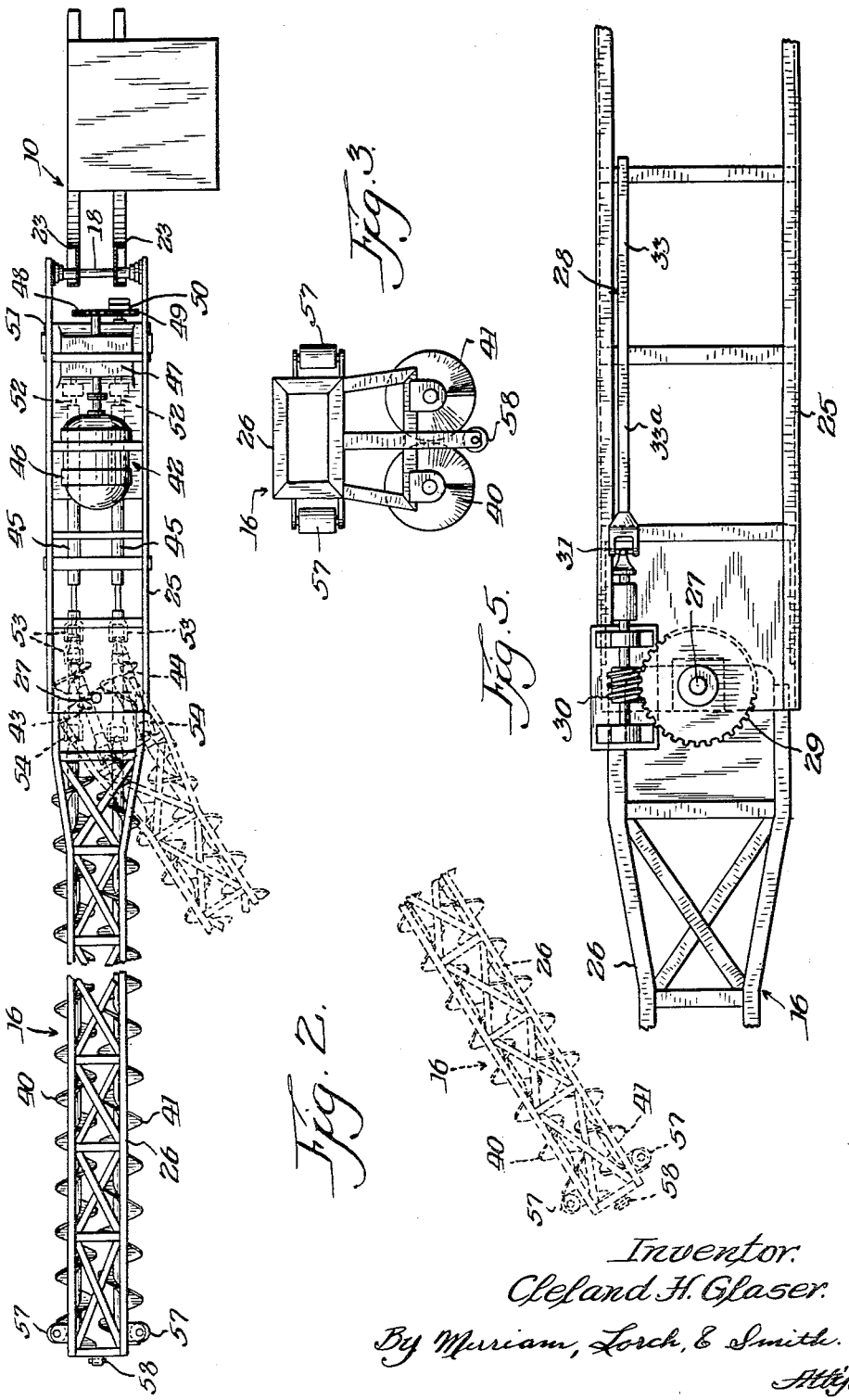
Inventor.
Cleland H. Glaser.
By Miriam, Lorch, & Smith.
Attys.

June 28, 1960  C. H. GLASER  2,942,714
BULK MATERIAL UNLOADER
Filed April 25, 1958  3 Sheets-Sheet 3
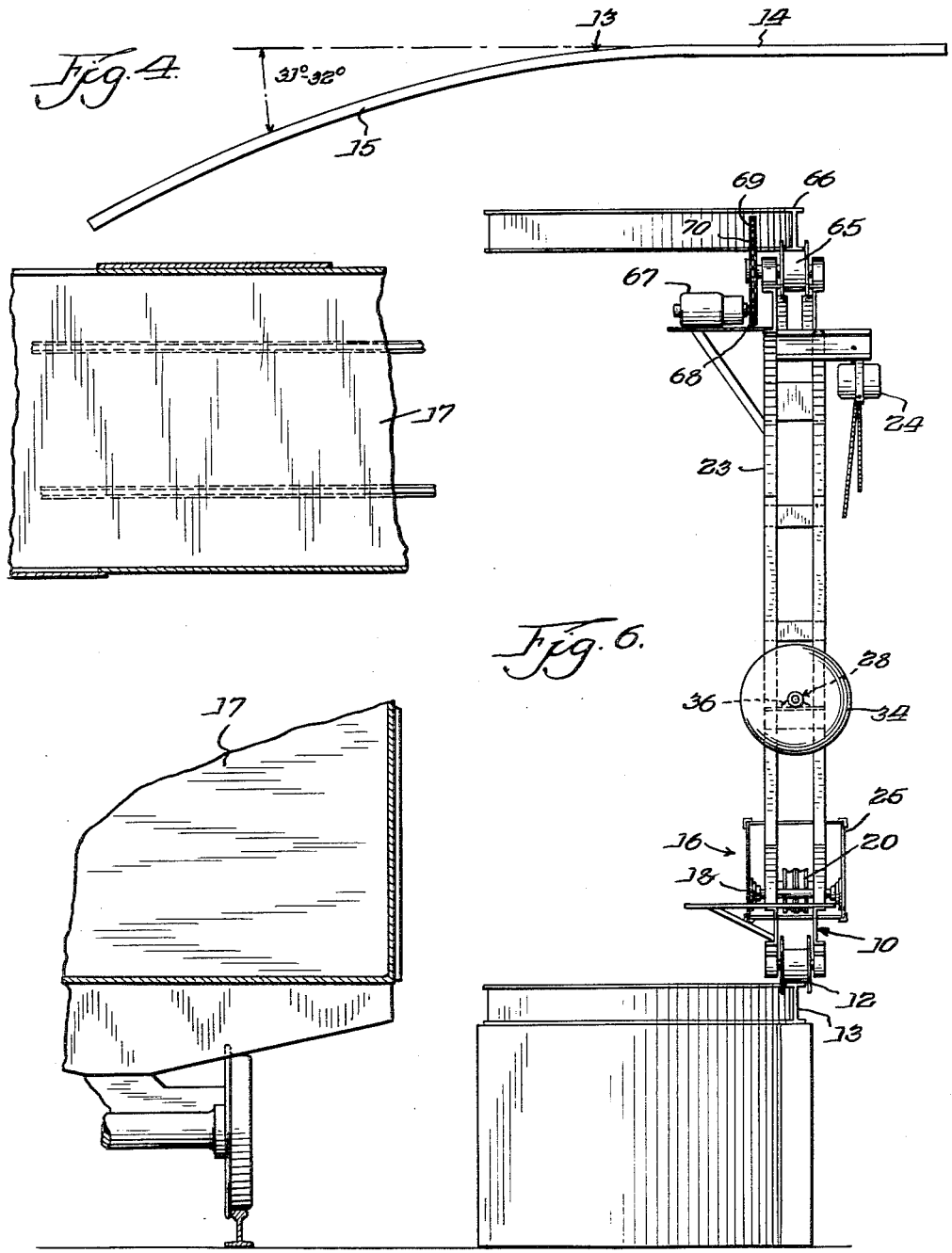

United States Patent Office 2,942,714
Patented June 28, 1960

2,942,714
BULK MATERIAL UNLOADER

Cleland H. Glaser, Memphis, Tenn., assignor to Allied Mills, Inc., Chicago, Ill., a corporation of Indiana Filed Apr. 25, 1958, Ser. No. 730,952

9 Claims. (Cl. 198—5)

This invention relates to an unloader for handling grain, dry chemicals, and other bulk materials. It is especially directed to an unloader for unloading bulk materials from conventional box cars having side door openings.

Although shipments of bulk materials such as cement, dry chemicals, grain, and other materials are made in bags containing these materials, large processing facilities in order to reduce the cost of bagged shipments require that the bulk material be shipped in unbagged form in various types of transportation vehicles. The unloading of these bulk materials presents a problem in material handling, especially in connection with the unloading of railroad cars of the type conventionally known as "box cars." Because the side opening doors provide only a relatively limited access to the interior of the car, there are limitations on the types of material handling devices that can be used for unloading these railroad cars. The hand shoveling of such bulk materials has obvious disadvantages which gave rise to the development of power shovels which operate in the manner of conventional drag lines. These power shovels generally are operated by means of cables which are connected to a prime mover through various sheave arrangements. This, of course, requires that the railroad car, upon arrival at the unloading station, be adapted for use with such unloading devices.

Screw-type conveyors have also found application in this service. Because of the weight and size of prior art installation, the amount of labor and equipment required to manipulate and position the conveyors has militated against their extensive use for this purpose.

Because railroad car demurrage is a serious consideration in handling costs, it is desirable that the cars be unloaded as rapidly as possible in order to avoid the accumulation of unnecessary demurrage costs.

According to this invention there is provided a grain transportation vehicle, screw-type conveyor unloader which can be readily positioned within the confines of the grain holds with a minimum of labor, avoids the necessity of rigging the car for use with cable operated power shovels and which permits a substantial reduction in the unloading time required.

Figure 2 is a top plan view of the boom member of the unloader illustrating by means of dotted lines the lateral positioning of the pivotally mounted, end section of the boom member;

Figure 3 is an end view of the pivotally mounted, end section of the boom member showing the relative positioning of the conveyor elements;

Figure 4 is a plan view of the lower rail element upon which the unloader carriage shown in Figure 1 rides showing the relation of the unloader track to the adjacent railroad tracks and box car, of which a fragmentary view is shown, when the box car is positioned for unloading;

Figure 5 illustrates the manual control employed for laterally positioning the pivotally mounted, end section of the boom member; and Figure 6 is a side elevation view illustrating the monorail mounting of the unloader carriage on the track system.

Figure 1:
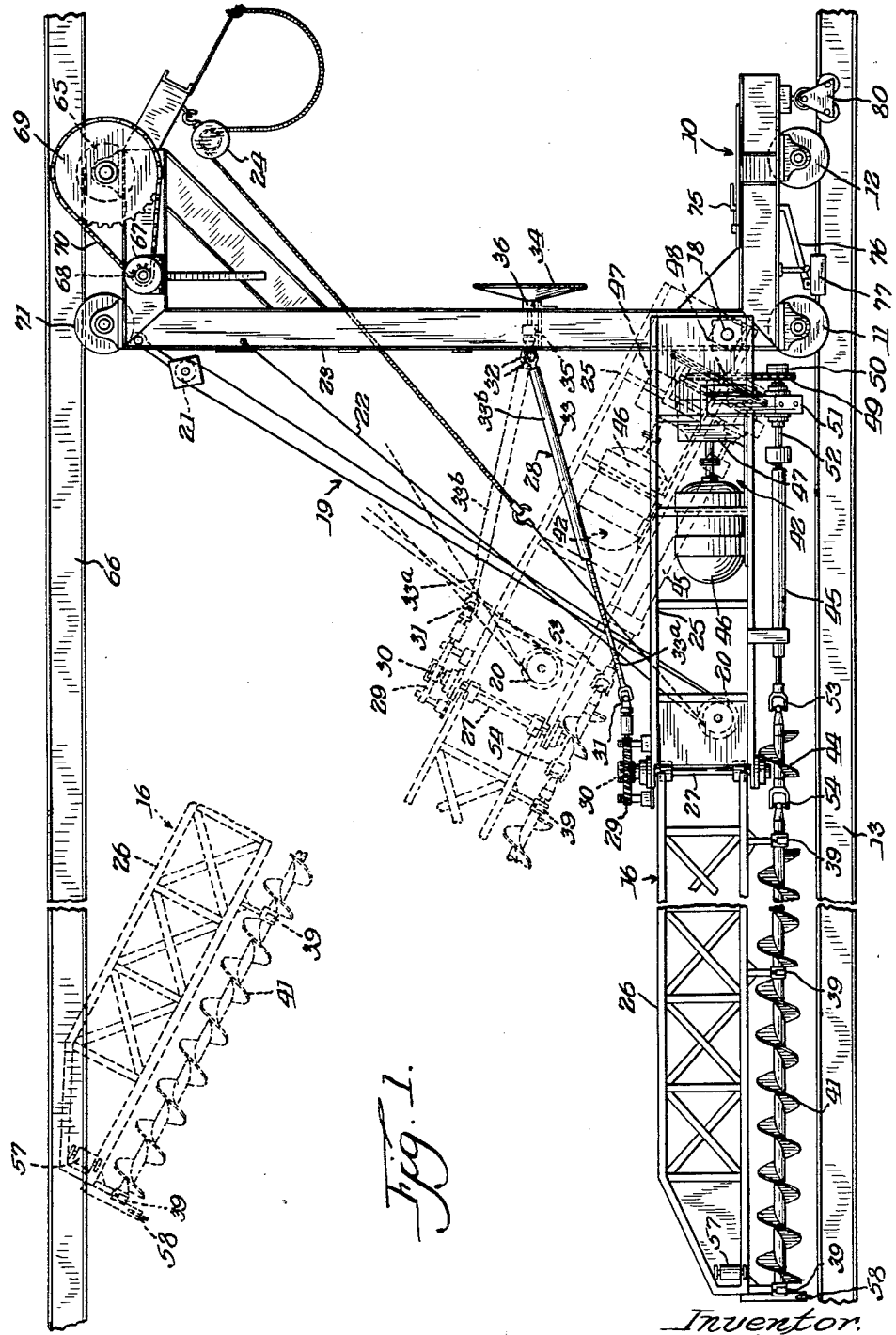
Figure 1 illustrates a side elevation view of one embodiment of the unloader employed in unloading box cars. The boom member of the unloader is shown in an elevated position by means of dotted lines.

Referring to the embodiment of the invention shown in the drawings, it will be seen that the unloader of this invention comprises carriage member 10 having mounted thereon wheels 11 and 12 which engage track 13. As seen in Figure 4, the track has a straight portion 14 and an angular portion 15. In unloading conventional box cars where the carriage track parallels the railroad track, it is important that the angle at which the angular portion joins the straight portion be such that boom member 16 can readily be manipulated through the open door of box car 17, which has its doorway positioned adjacent the terminal end of track 13. Boom member 16 is pivotally attached to carriage 10 on a horizontal axis by means of axle 18. Pivoted in this manner, boom member 16 can be raised and lowered by means of conventional tackle arrangement 19, comprising sheaves 20 and 21 and cable 22 which is anchored at one end to upright member 23 mounted on carriage 10. The other end of cable 22 is affixed to a suitable winch 24 which supplies the necessary power for raising boom member 16. Boom member 16 consists of two sections; the hoist section 25 and pivotally mounted, end section 26. The hoist section 25 is adapted for raising and lowering boom member 16 by means of tackle system 19 and axle 18 which is mounted on the frame of carriage 10. End section 26 is pivotally mounted by means of vertical axle 27 to hoist section 25 of the boom member to permit the lateral positioning of end section 26. This lateral positioning of the boom member is effected by drive mechanism 28 which in the illustrative embodiment of this invention shown in the drawings is manually controlled. This drive mechanism consists of worm gear 29 which is integrally connected to axle 27. Axle 27 is in turn fastened to pivotally mounted, end section 26 of boom member 16 so that the rotation of vertical axle 27 causes the lateral movement of end section 26. Enmeshing with worm gear 29 is worm 30 which is connected by means of universal joints 31 and 32 and drive shaft 33 to drive wheel 34. Drive wheel 34 is journaled in bearings 35 and 36. Rotation of drive wheel 34 produces the side to side action of end section 26 of boom member 16. In order to permit the raising and lowering of boom member 16, it is necessary that drive shaft 33 be fabricated from telescoping elements 33a and 33b whereby one member can telescope into the other in order to permit the shortening of drive shaft 33 which is required when boom member 16 is raised to an elevated position. It is apparent that conventional arrangements, such as cooperating splined shafts, can be utilized for permitting this telescoping arrangement without sacrificing the torsion requirements of drive shaft 33.

Affixed to the underside of boom member 16 is a pair of screw conveyors 40 and 41 which are journaled in bearings 39 mounted in suitable supports on the underside of end section 26 of boom member 16. Screw conveyors 40 and 41 are connected to a drive means 42 by means of intermediate screw conveyor sections 43 and 44 and drive shafts 45. Drive means 42 comprises a prime mover such as electric motor 46 coupled to a speed reducer 47 which has a power take-off sprocket 48. A chain 49 connects power take-off sprocket 48 with drive sprocket 50 which is affixed to the input shaft of gear drive 51 which is provided with two output shafts 52 which are coupled to drive shafts 45. In order to permit the out-of-line operation of the conveyor elements 40, 41, 43, and 44 when end section 16 is laterally positioned, the various driven sections are interconnected by universal joints 53 and 54.

In order to facilitate the positioning of the boom member 16 within the box car, rollers 57 are provided on each side of the boom at the terminal end. Rollers 57 engage the side walls of the box car and permit the end of boom member 16 to slide along the box car wall. Caster 58 is provided on the end boom member 16 to retain the conveyor elements spaced from the floor of the vehicle being unloaded.

Carriage member 10 is driven by means of a drive rail wheel 65 which frictionally engages the upper track 66 which has the same configuration as lower track 13. In the illustrative embodiment drive rail wheel 65 is rotated by an electric motor 67 which is connected to drive rail wheel 65 by a suitable chain drive consisting of a drive sprocket 68, a driven sprocket 69, and chain 70. The electric motor is controlled by a switch positioned on upright member 23, convenient to the operator, along with switch means for controlling motor 46. To provide stability to the carriage member there is provided on upright member 23 of carriage 10 bearing wheels 71 which engage the upper track member 66.

Also provided on carriage 10 are auxiliary devices such as brake 75 which through a suitable linkage 76 positions brake shoe 77 in frictional engagement with lower track 13. Also an idler trolley 80 is provided in order to increase stability of the carriage member 10 while operating on the track system consisting of upper track 66 and lower track 13.

In the operation of this invention as a box car unloader the box car is positioned adjacent the angular section of the track system consisting of tracks 13 and 66 with the door of the box car adjacent the terminal end of the angular section of the track system. With the operator in position on carriage 10 the entire apparatus is maneuvered into position within the box car by suitably manipulating the pivotally mounted end section 26 of boom 16 as well as elevating the entire boom member. In this manner the boom member can be positioned in either the far corner of the car closest to or farthest from the side from which the car is being unloaded. With the boom in place the screw conveyors are positioned atop the pile of bulk material to be unloaded and the screw conveyors 40, 41, 43, and 44 are caused to rotate to effect the unloading of the bulk material.

The screw conveyors which are used have opposed pitches. In the illustrative embodiment a right hand pitched screw conveyor is provided on the right hand side of the boom facing the operator and a left hand pitched screw conveyor is provided on the left hand side of the boom member facing the operator.

The flexibility of the boom member in combination with the track configuration permits the unloader to be deftly maneuvered in order to substantially completely unload one half of the box car without requiring the complete repositioning of the unloader. The use of a second unloader which would operate from the opposite direction would effect the unloading of the other half of the box car.

It is apparent from the illustrative embodiment that only the mechanical elements of the unloader are pictorially shown. Auxiliary equipment such as electrical switches and electrical conductor leads have been omitted to avoid confusion and facilitate an understanding of the invention.

Conventional materials of construction are utilized in fabricating the various members of the unloader. The boom member can be fabricated as a truss-like member with suitable cross bracing as shown in the drawing or any other structural unit which will provide sufficient rigidity to insure the alignment of the screw conveyors employed without warping or distortion. Although a box girder arrangement is preferred, it is obvious that any other type of cantilevered construction can be employed. The pivoting of the end member can also be effected by other equivalent means to the worm and pinion gear arrangement shown in the illustrative embodiment. Although a manual control and pivotally mounted end section 26 of boom member 16 is suitable, it may be preferred to employ an electric motor or other similar drive means for providing the non-manual pivoting of this member. To permit suitable articulation of the hoist and end portions of the boom member, the end portion should be about 2 to 3 times as long as the hoist portion. Also the end portion should be long enough to reach into the far corners of the vehicle being unloaded when the unloader is properly positioned.

Also the raising and lowering hoist section 25 of boom member 16 can be carried out by a geared movement suitably powered which would eliminate the cable arrangement utilized in the illustrative embodiment.

Although a mono rail system is shown, it is possible to employ a two track arrangement on both the upper and lower track members. In installing the track section, the top of the lower track is installed at the same elevation as the floor of the box car which is to be unloaded. The angle at which the angular section 15 of the track system is positioned is important and must be at such an angle so as to permit the unloader to be readily manipulated into the box car without undue maneuvering of the carriage and boom members of the unloader.

A rail system of this type and cooperating carriage are employed when there is only relatively small amounts of clearance between the sidewalls of the vehicle being unloaded and adjacent structures. If a wide unloading dock is available, it is possible to mount the boom member of the unloader on a trackless carriage having an elevating mechanism such as a conventional "lift truck" and provide boom controls which could be conveniently operated by the driver of the carriage. If this expedient is employed, suitable power take-offs operated by the prime mover of the trackless carriage for manipulating the boom as well as driving the screw conveyors, can be provided.

Although in the illustrative embodiment a pair of screw conveyors are installed on boom 16, it is apparent that other arrangements of conveyors containing two or more screw conveyors can be utilized. It is necessary, however, to employ the conveyors such that no undue stresses are applied to the boom member while the screw conveyors are engaged in the unloading operation. Accordingly, it is necessary to use a right hand and left hand screw conveyor when operating in a pair. In the event that other screw conveyor arrangements are employed using a plurality of screw conveyors, this resolution of forces must be considered in the design.

In a complete specific embodiment of this invention employed for the unloading of box cars, the unloader was operated on a track system comprising a bottom and top rail spaced 12' apart. The rails consisted of 4" x 8" standard I beam structural shapes, the total length of track being 33 feet, with the angular section being about 18 feet long and joined to the straight section at an angle of about 31°. The straight section of track was positioned parallel with the railroad tracks about 12 feet from the center line of the railroad track. A box girder type boom member 23' 6" was employed. The boom member consisted of a hoist section 7' long and a pivotally mounted end section 16' 6" long. Installed underneath the pivotally mounted end section of the boom member were two 9" screw conveyors, one right handed and the other left handed, with their respective axes being positioned about 9" apart. These were connected to the drive means by two intermediate sections of 9" screw conveyors and suitable drive shafts which were interconnected by universal joints. On the hoist section of the boom a 7½

H.P., 1800 r.p.m. electric motor was mounted and coupled to a speed reducer having an output speed of 230 r.p.m. The speed reducer was connected by a chain drive to a gear box, having two output shafts, one shaft turning to the right and the other shaft turning to the left. A gear box was provided which gave an output shaft speed of about 300 r.p.m. The carriage was driven by a ⅓ H.P. electric motor which was connected to a drive wheel such that the carriage could be driven at the rate of about 30 feet per minute. In order to raise and lower the boom member a one ton electrically driven hoist was used for applying the necessary force to a threefold tackle arrangement. The pivotally mounted end section of the boom member was rotated by means of a 12″ worm gear which meshed with a 4″ worm. The pivoting arrangement of the pivotally mounted end section of the boom member permitted this section to pivot about 32° on either side of the hoist section of the boom member.

Employing two conventional power shovels, a box car containing bulk corn weighing 112,000 pounds required 3⅓ man-hours and a box car containing 100,000 pounds of soybean meal required 5⅓ man-hours to unload. Using the hereindescribed unloader the former required less than one man-hour and the latter 1⅓ man-hour to complete the unloading.

Although this invention is specifically illustrated by the drawings and the foregoing example, it is to be understood that various modifications can be made by those skilled in the art to which this invention pertains without departing from the spirit and scope of the invention.

What is claimed is:

1. An unloader for removing bulk material from an enclosed bin having a horizontal floor portion which comprises an automotive carriage member, a cantilevered boom member supported by said carriage member and constructed to rest on said floor, said boom member comprising a hoist portion mounted on a horizontal axis on said carriage member and a terminal end portion pivotally mounted on a vertical axis on said hoist portion whereby said end portion can be laterally positioned, means on said carriage member cooperating with said hoist portion for raising and lowering said boom member, means controllable from said carriage member for laterally positioning said end portion, at least a pair of bulk carrier, screw conveyor means mounted on the underside of said boom member coextensive with at least said end portion, means for driving said conveying means, said carriage member and said boom member being adapted to cooperate to permit the introduction and manipulation of said boom member into the confines of an enclosed bin.

2. An unloader for removing bulk material from an enclosed rectangular bin having a side opening and a horizontal floor portion which comprises a track system having a configuration comprising a straight portion and an angular portion, an automotive carriage member, said carriage member being adapted to move along said track, a cantilevered boom member constructed to rest on said floor and comprising a hoist portion mounted on a horizontal axis on said carriage member, and a terminal end portion pivotally mounted on a vertical axis on said hoist portion whereby said end portion can be laterally positioned, means on said carriage member cooperating with said hoist section for raising and lowering said hoist portion, means controllable from said carriage member for laterally positioning said end portion, at least a pair of bulk carrier, screw conveyor means mounted on the underside of said boom member coextensive with at least said end portion, means for driving said conveyor means, said track configuration and said boom member being adapted to cooperate to permit the introduction and manipulation of said boom member into the confines of the enclosed bin through the said side opening.

3. An unloader for removing bulk material from an enclosed rectangular bin having a side opening and a horizontal floor portion which comprises a track system having a configuration having a straight portion and an angular portion, the straight portion of said track being parallel with the longitudinal axis of said bin, an automotive carriage member, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, means on said carriage member cooperating with said hoist section for raising and lowering said hoist portion, means controllable from said carriage member for laterally positioning said end portion, at least a pair of bulk carrier, screw conveyor means mounted on the underside of said boom member coextensive with at least said end portion, means for driving said conveyor means, said track configuration and said boom member being adapted to cooperate to permit the introduction and manipulation of said boom member into the confines of the enclosed bin through the said side opening.

4. An unloader for removing bulk material from an enclosed rectangular bin having a side opening and a horizontal floor portion which comprises mono rail track system having a configuration having a straight portion and an angular portion, the straight portion of said track being parallel with the longitudinal axis of said bin, an automotive carriage, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, means on said carriage member cooperating with said hoist section for raising and lowering said hoist portion, means controllable from said carriage member for laterally positioning said end portion, at least a pair of bulk carrier, screw conveyor means mounted on the underside of said boom member coextensive with at least said end portion, and means for driving said conveyor means, said track configuration and said boom member being adapted to cooperate to permit the introduction and manipulation of said boom member into the confines of the enclosed bin through the said side opening.

5. An unloader for removing bulk material from an enclosed rectangular bin having a side opening and a horizontal floor portion which comprises a track system having a configuration comprising a straight portion and an angular portion, an automotive carriage member, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, said end portion being 2–3 times as long as said hoist portion, means on said carriage member cooperating with said hoist section for raising and lowering said hoist portion, means controllable from said carriage member for laterally positioning said end portion, at least a pair of bulk carrier, screw conveyor means mounted on the underside of said boom member coextensive with at least said end portion, and means for driving said conveyor means, said track configuration and said boom member being adapted to cooperate to permit the introduction and manipulation of said boom member into the confines of the enclosed bin through the said side opening.

6. An unloader for removing bulk material from an enclosed rectangular bin having a side opening and a horizontal floor portion which comprises a track system having a configuration comprising a straight portion and an angular portion, an automotive carriage member, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, means on said carriage member cooperating with said hoist section for raising and lowering said hoist portion, means controllable from said carriage member for laterally positioning said end portion comprising a worm gear integral with said vertical axis, a worm cooperating with said worm gear and a telescoping drive shaft rotatable from said carriage member, at least a pair of bulk carrier, screw conveyor means mounted on the underside of said boom member coextensive with at least said end portion, and means for driving said conveying means, said track configuration and said boom member being adapted to cooperate to permit the introduction and manipulation of said boom member into the confines of the enclosed bin through the said side opening.

7. An unloader for removing bulk material from an enclosed rectangular bin having a side opening and a horizontal floor portion which comprises a track system having a configuration comprising a straight portion and an angular portion, an automotive carriage member having an upright frame element, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, means on said carriage member cooperating with said hoist section for raising and lowering said hoist portion comprising a multifold tackle arrangement cooperating with the upright frame element of said carriage member and a prime mover for operating said multifold tackle arrangement, means controllable from said carriage member for laterally positioning said end portion, at least a pair of bulk carrier, screw conveyor means mounted on the underside of said boom member coextensive with at least said end portion, and means for driving said conveying means, said track configuration and said boom member being adapted to cooperate to permit the introduction and manipulation of said boom member into the confines of the enclosed bin through the said side opening.

8. An unloader for removing bulk material from an enclosed rectangular bin having a side opening and a horizontal floor portion which comprises a track system having a configuration comprising a straight portion and an angular portion, an automotive carriage member, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, means on said carriage member cooperating with said hoist section for raising and lowering said hoist portion, means controllable from said carriage member for laterally positioning said end portion, a pair of bulk carrier, screw conveying means mounted on axes spaced about one screw conveyor means diameter apart on the underside of said boom member coextensive with at least said end portion, means for driving said conveying means, said track configuration and said boom member being adapted to cooperate to permit the introduction and manipulation of said boom member into the confines of the enclosed bin through the said side opening.

9. An unloader for removing bulk material from an enclosed rectangular bin having a side opening and a horizontal floor portion which comprises a track system having a configuration having a straight portion and an angular portion, the straight portion of said track being parallel with the longitudinal axis of said bin, an automotive carriage member having an upright frame element, said carriage member being adapted to move along said track, a cantilevered boom member constructed to rest on said floor comprising a hoist portion mounted on a horizontal axis on said carriage member and a terminal end portion pivotally mounted on a vertical axis on said hoist portion whereby said end portion can be laterally positioned, said end portion being 2–3 times as long as said hoist portion, means on said carriage member cooperating with said hoist section for raising and lowering said hoist portion, comprising a multifold tackle arrangement cooperating with the upright frame element of said carriage member and a prime mover for operating said multifold tackle arrangement, means controllable from said carriage member for laterally positioning said end portion comprising a worm gear integral with said vertical axis, a worm cooperating with said worm gear, and a telescoping drive shaft rotatable from said carriage member, a pair of bulk carrier, screw conveyor means mounted on axis spaced one screw conveyor means diameter apart on the underside of said boom member coextensive with at least said end portion, and means for driving said conveying means, said track configuration and said boom member being adapted to cooperate to permit the introduction and manipulation of said boom member into the confines of the enclosed bin through the said side opening.

References Cited in the file of this patent

UNITED STATES PATENTS

| | | |
|---|---|---|
| 2,073,793 | Gyger | Mar. 16, 1937 |
| 2,719,058 | Van Dusen | Sept. 27, 1955 |
| 2,800,991 | Manierre | July 30, 1957 |